United States Patent
Crow et al.

(10) Patent No.: US 7,789,015 B2
(45) Date of Patent: Sep. 7, 2010

(54) HANDLE FOR ELECTRIC COOKING APPLIANCE

(75) Inventors: Douglas Scott Crow, Seabrook, NH (US); Janet Lynne Talbot, Uxbridge, MA (US)

(73) Assignee: Sunbeam Products, Inc., Boca Raton, FL (US)

( * ) Notice: Subject to any disclaimer, the term of this patent is extended or adjusted under 35 U.S.C. 154(b) by 1333 days.

(21) Appl. No.: 11/216,835

(22) Filed: Aug. 31, 2005

(65) Prior Publication Data

US 2006/0130669 A1 Jun. 22, 2006

Related U.S. Application Data

(60) Provisional application No. 60/606,167, filed on Aug. 31, 2004.

(51) Int. Cl.
*A47J 36/00* (2006.01)
*A47J 27/00* (2006.01)
*A47J 45/06* (2006.01)
*A47J 45/07* (2006.01)

(52) U.S. Cl. ............ 99/403; 219/429; 126/373.1; 126/390.1; 220/573.1; 220/752; 220/759; 16/110.1; 16/444

(58) Field of Classification Search ........... 99/337–340, 99/403–417, 426, 422–425, 444–450; 220/752–755, 220/573.1, 912; 16/425–436, 110.1; 219/490–495, 219/618, 627, 521–525, 702
See application file for complete search history.

(56) References Cited

U.S. PATENT DOCUMENTS

| | | | | |
|---|---|---|---|---|
| 2,431,808 A | * | 12/1947 | Kluit | 220/755 |
| 2,931,884 A | * | 4/1960 | Jepson et al. | 219/436 |
| 3,334,782 A | | 8/1967 | Friberg | |
| 3,616,964 A | * | 11/1971 | Yamazaki | 220/753 |
| 3,774,263 A | | 11/1973 | Day et al. | |
| 3,956,792 A | | 5/1976 | Fischbach | |
| 4,724,576 A | * | 2/1988 | Tatematsu | 220/763 |
| 4,781,302 A | * | 11/1988 | Pearson | 220/752 |
| 4,794,666 A | | 1/1989 | Kim | |
| 4,825,505 A | * | 5/1989 | Witte | 16/425 |
| 5,373,505 A | * | 12/1994 | Schmidt et al. | 370/368 |
| 5,673,458 A | * | 10/1997 | Raoult | 16/425 |
| 5,704,092 A | * | 1/1998 | Nicollet et al. | 16/425 |
| 6,237,471 B1 | * | 5/2001 | Nam | 99/422 |
| 6,250,493 B1 | * | 6/2001 | Kwan | 220/759 |
| 6,257,439 B1 | * | 7/2001 | Hsu | 220/759 |

(Continued)

FOREIGN PATENT DOCUMENTS

GB 2 142 868 A 1/1985

(Continued)

*Primary Examiner*—Joseph M Pelham
(74) *Attorney, Agent, or Firm*—Lawrence J. Shurupoff

(57) ABSTRACT

A handle assembly is provided for the base of an electric cooking appliance. The handle assembly includes a thermoplastic handle including an integral base portion, a bracket having substantial rigidity positioned between the base portion of the handle and the exterior surface of the base, a first fastener connecting the handle to the outer wall of the base, a second fastener connecting the bracket to the outer wall of the base independently of the handle, and a connecting member connecting the bracket to the handle. The connecting member and first fastener may be the same element. An electric cooking appliance including such a handle assembly is further provided.

17 Claims, 3 Drawing Sheets

U.S. PATENT DOCUMENTS

| | | | |
|---|---|---|---|
| 6,341,714 B1 * | 1/2002 | Bogani | 220/759 |
| 6,573,483 B1 * | 6/2003 | DeCobert et al. | 219/506 |
| 6,631,824 B2 * | 10/2003 | Park | 220/740 |
| 6,694,868 B1 * | 2/2004 | Hung | 99/403 |
| 7,021,199 B2 * | 4/2006 | Lubowicki et al. | 99/372 |
| 7,165,489 B1 * | 1/2007 | Fernandez et al. | 99/422 |
| 2003/0116556 A1 * | 6/2003 | Li | 219/433 |

FOREIGN PATENT DOCUMENTS

GB 2142868 A 1/1985

* cited by examiner

HANDLE FOR ELECTRIC COOKING APPLIANCE

CROSS REFERENCE TO RELATED APPLICATION

This application claims benefit of Provisional Application Ser. No. 60/606,167 filed on Aug. 31, 2004.

BACKGROUND OF THE INVENTION

Electric cooking appliances such as slow cookers, rice cookers and roasters often include a base that contains one or more heating elements and a vessel that fits within a cavity in the base. The vessel contained within the base of a slow cooker is ordinarily made from a ceramic material. Roasters and rice cookers usually include vessels made from a metallic material. The vessels may be removable from the base or permanently affixed thereto. Lids are ordinarily provided for the vessels of the above-described appliances.

The base of an electric cooking appliance usually includes a pair of handles on opposite sides thereof. The handles allow the user to easily transport the base as well as other elements mounted to the base such as the vessel and lid.

Affixation of the handles to the base of an electric cooking appliance has been accomplished in a number of ways. One successful approach for connecting handles made from a plastic material has been to include a pair of tubes within the handle that receive a pair of screws. The screws extend through openings in the base that are aligned with the passages defined by the tubes. A handle connected in such a manner has included a base portion that is curved to match the contour of the appliance to which it is mounted and a horizontally extending portion to be grasped by the user. Part of the base portion extends below the horizontally extending portion, thereby protecting the user's fingers from engaging the outer surface of the base, which may be hot. The tubes extend into the horizontally extending portion. The entire handle is molded as an integral unit.

Another plastic handle designed for use with an electric cooking appliance has included three tubes for receiving screws, each of which is aligned with a corresponding opening in the outer wall of the base of the appliance. The tubes are arranged in a triangular configuration. The handle base includes a pair of projections beneath the tubes. Openings are provided in the outer wall of the base for receiving these projections.

A third handle used for electric cooking appliances is made entirely from metal. The handle includes a pair of generally L-shaped legs that are connected at one end by a horizontal member spaced away from the outer surface of the base of the appliance. The other ends of the legs are connected to the base by rivets. A thermoplastic washer is positioned between the end of each leg and the base. The washers reduce heat transfer to the handle. A metal plate is mounted inside the outer wall of the base. Both the plate and wall include openings for receiving the shaft portions of the rivets. The rivet heads adjoin the legs of the handle and the inner surface of the metal plate.

SUMMARY OF THE INVENTION

A handle assembly is provided for the base of an electric cooking appliance such as a slow cooker, electric roaster or a rice cooker. The handle assembly includes a thermoplastic handle including an integral base portion. A plurality of passages are provided in the handle for receiving screws. Projections extend from the handle. Locking members such as lock washers are provided for mounting to the projections. In use, the lock washers would engage an inner surface of the appliance. A metal bracket having openings for receiving the projections is provided. The bracket further includes openings that are alignable with the passages and tabs for engaging a wall of the appliance.

The invention further relates to an electric cooking appliance including a base and a handle assembly secured to an outer wall of the base. The handle assembly is comprised of a handle made from a thermoplastic material. A base portion of the handle is positioned proximal to the exterior surface of the base. A bracket having substantial rigidity is positioned between the base portion of the handle and the exterior surface of the base. A first fastener, such as a screw, connects the handle to the outer wall of the base. A second fastener, such as a tab formed integrally with the bracket connects the bracket to the outer wall of the base. One or more connecting members connect the bracket and handle to each other. The connecting members may include the first fastener.

The invention further relates to an electric cooking appliance including a base having a heating element, a thermoplastic handle having a base portion proximal to the exterior surface of the base, a bracket having substantial rigidity positioned between the exterior surface of the base and the base portion of the handle, means for connecting the handle to the base, means for connecting the bracket to the base, and means for connecting the handle to the bracket.

DETAILED DESCRIPTION OF THE INVENTION

Figure 1:
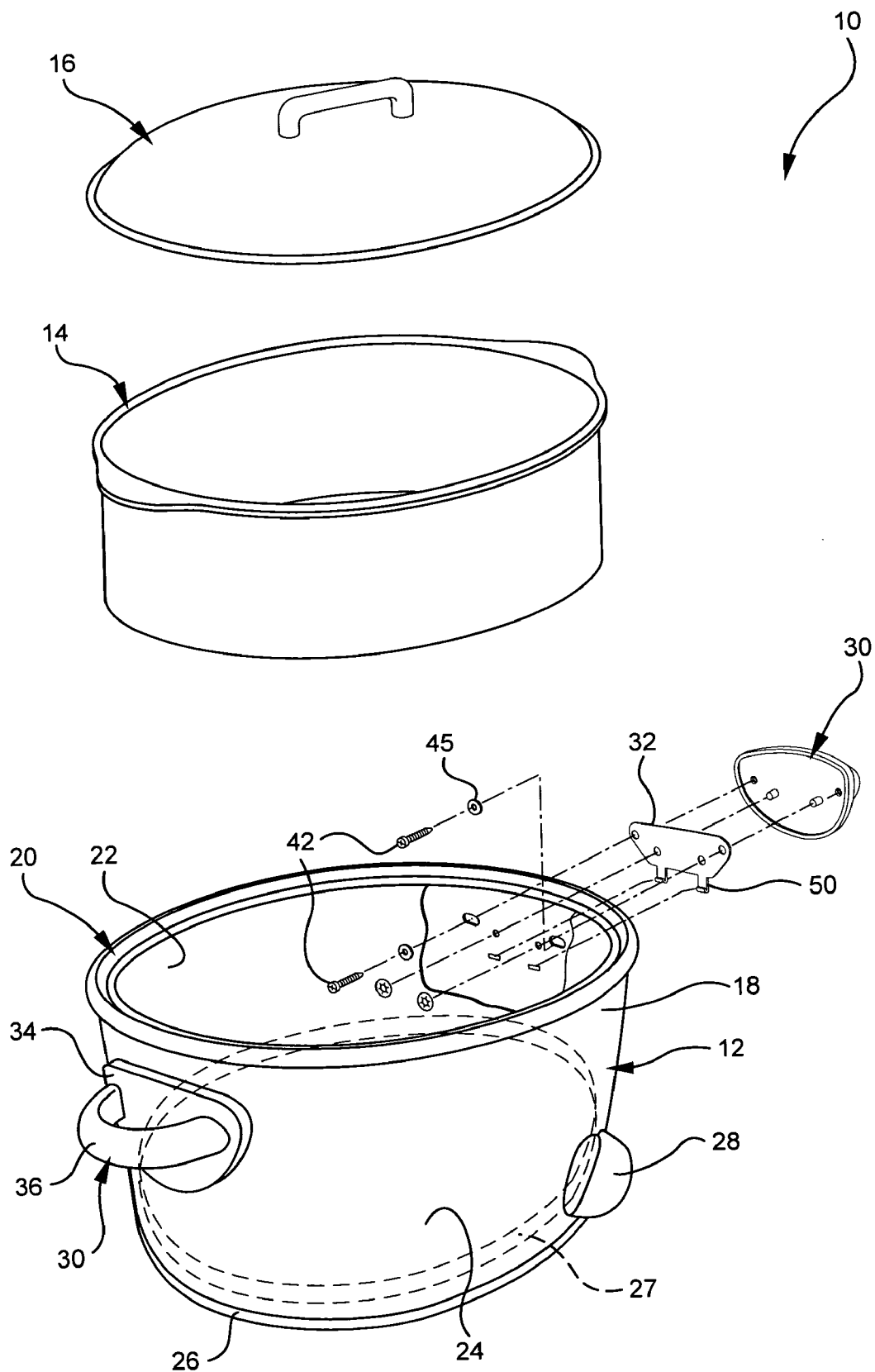
FIG. 1 is a top exploded perspective view showing a slow cooker having handle assemblies in accordance with the invention.

The description which follows relates to a preferred embodiment of the invention and is not intended to be limiting as to the scope thereof.

A handle assembly is provided for an electric cooking apparatus. While shown and described in association with a slow cooker 10, the handle assembly can be employed as part of other electric cooking devices such as roasters and rice cookers.

The slow cooker 10 includes a base 12, a cooking vessel 14, and a lid 16. The base 12 is comprised of an outer side wall 18, a metal liner 20 comprised of a side wall 22 and bottom wall 24, and a plate-like bottom 26. A heating element 27 is positioned between the two side walls 18, 22 of the base. The bottom 26 is supported by several feet (not shown). The upper portion of the metal liner 20 and the outer periphery of the bottom 26 include lip portions for receiving the upper and lower ends of the outer side wall 18. A control device 28 is mounted to the outer side wall 18 for turning the heating element on and off, controlling the temperature of the heating element, and/or other functions. The outer side wall is preferably made from metal such as stainless steel. The cooking vessel is preferably made from a ceramic material. U.S. Pat. No. 6,573,483, which is incorporated by reference herein, discloses slow cookers including bases, cooking vessels, and different types of control devices.

Each handle assembly secured to the outer side wall 18 of the slow cooker is comprised of a handle 30 made from a thermoplastic material such as polyvinylchloride, a metal bracket 32, and a plurality of elements used to secure the handle and bracket to the base 12. The handle 30 includes an integral base portion 34 and a horizontally extending loop 36. The opening between the base portion and loop is sufficient to accommodate one or more fingers. It will be appreciated that the principles of the invention are applicable to handles having many different configurations.

The base portion 34 of the handle adjoins the outer surface of the outer side wall 18. As this surface is curved, the adjoining part of the base portion 34 is similarly curved. It is preferable that the base portion is substantially flush with the surface it adjoins, whether curved or flat. A pair of cylindrical projections 38 extend from the base portion and through aligned openings in the bracket 32 and outer side wall 18. The base portion further includes a pair of cylindrical passages 40 for receiving screws 42 used to connect the handle to the outer side wall 18.

Figure 2:
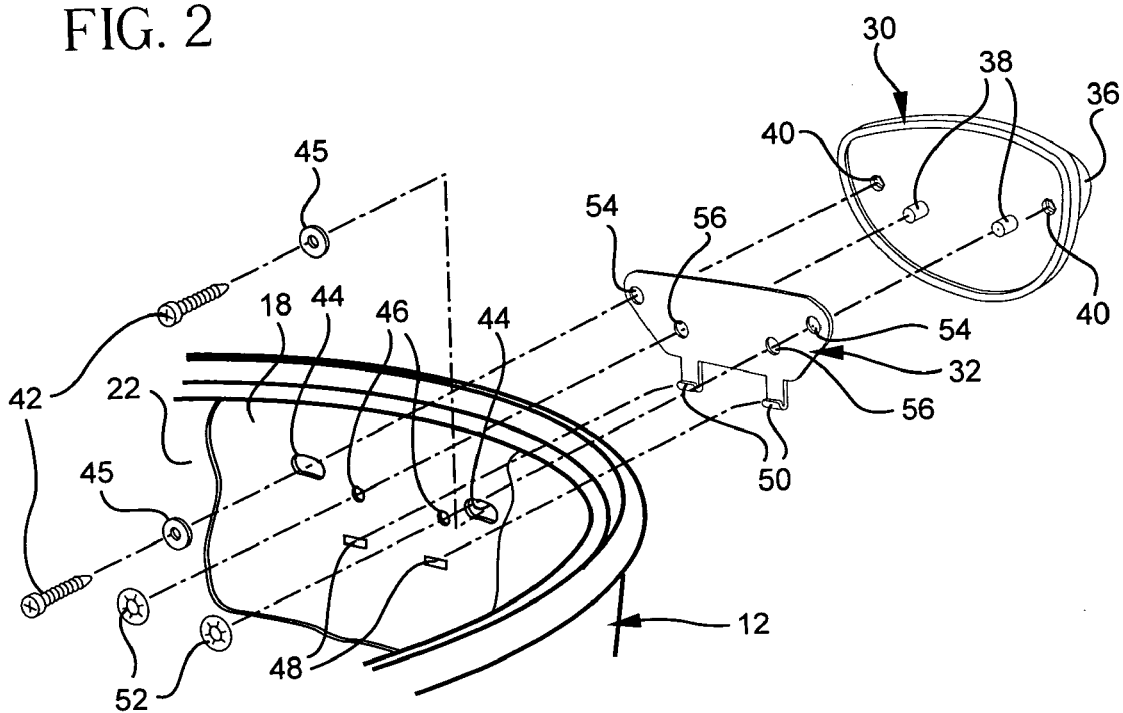
FIG. 2 is an exploded perspective view of one of the handle assemblies and a cut-away portion of the slow cooker.
Figure 4:
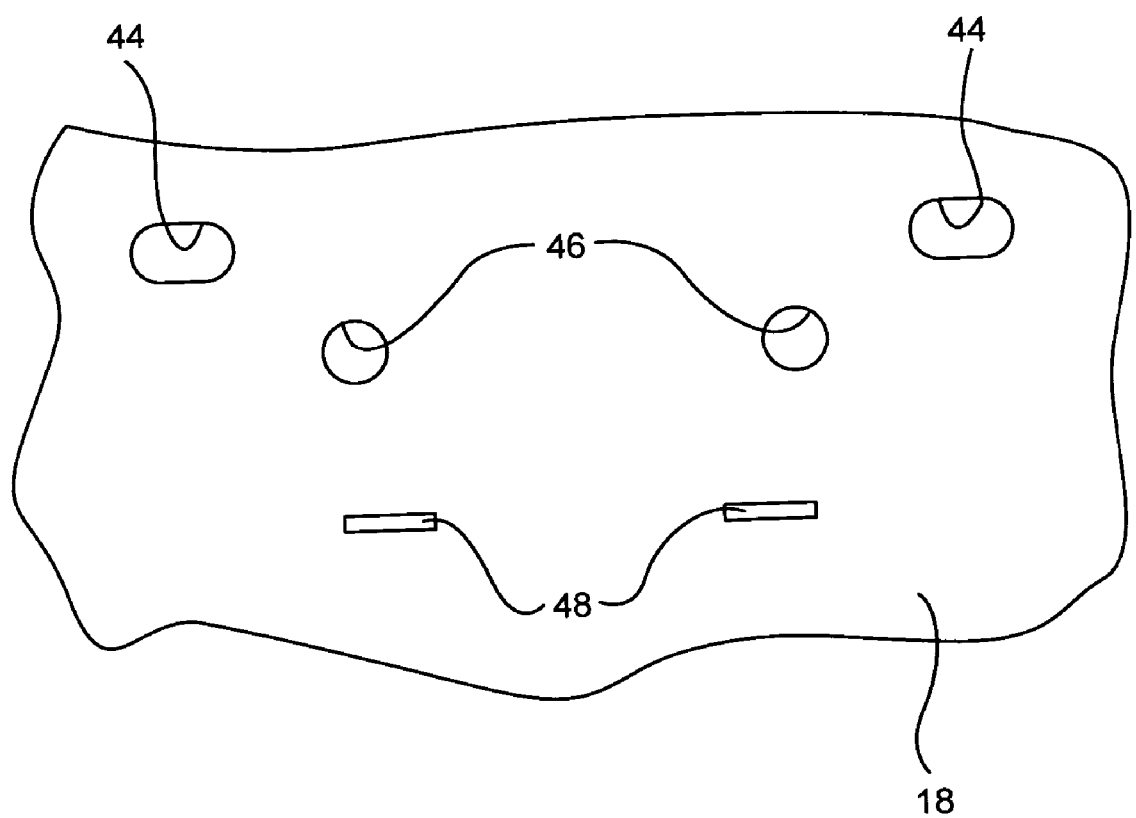
FIG. 4 is an elevation view of an outer wall of the slow cooker.

Referring to FIGS. 2 and 4, the opposing ends of the outer side wall 18 of the base 12 each include two openings 44 aligned with the passages 40, two openings 46 for receiving the cylindrical projections 38, and two thin rectangular slots 48. The slots receive tabs 50 extending from the bottom of the metal bracket 32. The tabs 50 are bent upwardly at their ends and adjoin the inner surface of the outer wall 18. They are preferably equal in length. The width of the slots is substantially the same as the maximum width of the tabs. The tabs and slots substantially prevent movement of the bracket 32 in any direction.

The screw openings 44 have substantially flat upper and lower edges and rounded sides. The heads of the screws 42 are preferably larger in diameter than at least the distance between the upper and lower edges of the openings 44. A washer 45 that is larger in diameter than all dimensions of the openings 44 is positioned between each screw head and the inner surface of the outer side wall 18.

Lock washers 52 are mounted to each of the cylindrical projections 38. The lock washers bear against the inner surface of the outer side wall. They engage the outer surface of the projections 38 and are substantially immovable from this position.

The use of the screws 42, tabs 50, and projections 38 and lock washers 52 in combination results in a handle connection that is strong and unlikely to loosen over time. The bracket, through the tabs, is secured to the outer side wall 18 of the base independently of the connections between the handle 30 and the base. The handle and bracket are connected to each other by the extension of the screws 42 and projections through openings 54, 56 in the bracket. Integral portions of both the handle and bracket extend through the outer side wall 18, complementing the screw connections.

Figure 3:
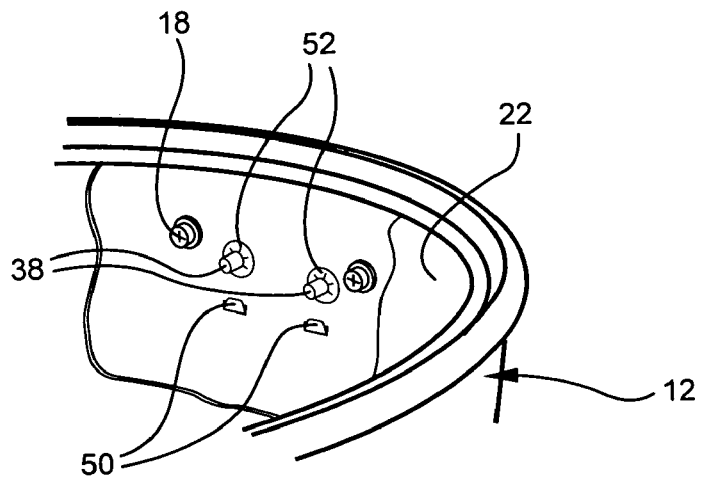
FIG. 3 is a perspective cut-away view of an end of the slow cooker.

The bracket 32 is preferably made from sheet metal or other suitable material having appropriate strength and rigidity for enhancing the connection between the handle 30 and base 12. The bracket preferably has substantial rigidity. While it can be bent along its vertical axis to conform to the curved interior surface of the base portion 34 of the handle 30 and the curved exterior surface of the base 12, it is difficult to pry open the tabs 50 from the positions shown in FIG. 3. It is also difficult to bend the bracket along its horizontal axis.

While the invention has been described with respect to a slow cooker, it has application to other electric cooking appliances that include bases having heating elements. Roasters and rice cookers, both of which have bases that support metal cooking vessels, are among the appliances to which handle assemblies as described above could be applied.

What is claimed is:

1. A handle assembly for an electric cooking appliance, comprising:
   a thermoplastic handle including an integral base portion;
   a plurality of passages in said handle for receiving screws;
   a plurality of projections extending from said handle and positioned for insertion within an electric cooking appliance;
   a plurality of locking members mountable to said projections;
   a metal bracket including a plurality of openings alignable with said passages in said handle and said projections, and
   a plurality of tabs extending from said bracket.

2. A handle assembly as described in claim 1 wherein said metal bracket substantially fits within said base portion.

3. A handle assembly as described in claim 2 wherein said bracket is comprised of a substantially flat plate, said tabs being integral with said plate and having hook-like end portions.

4. An electric cooking appliance comprising:
   a base including a heating element and an outer wall having an exterior surface and an interior surface;
   a handle assembly secured to said outer wall, said handle assembly including:
   a handle comprised of a thermoplastic material and including a base portion proximal to said exterior surface of said base;
   a bracket having substantial rigidity positioned between said base portion of said handle and said exterior surface of said base;
   a first fastener connecting said handle to said outer wall of said base;
   a second fastener connecting said bracket to said outer wall of said base independently of said handle;
   a connecting member connecting said bracket to said handle.

5. An electric cooking appliance as described in claim 4 wherein said connecting member and first fastener are the same element.

6. An electric cooking appliance as described in claim 5 wherein said first fastener is a screw extending through said outer wall and said bracket and into said handle.

7. An electric cooking appliance as described in claim 5 wherein said bracket is metal and said second fastener is integral with said bracket.

8. An electric cooking appliance as described in claim 7 wherein said second fastener is a tab extending from said bracket and through said outer wall of said base.

9. An electric cooking appliance as described in claim 8 wherein said tab engages said interior surface of said outer wall of said base.

10. An electric cooking appliance as described in claim 9 wherein said bracket includes a plurality of tabs extending through said outer wall and engaging said interior surface of said outer wall of said base.

11. An electric cooking appliance as described in claim 10 including a plurality of first fasteners connecting said handle to said outer wall.

12. An electric cooking appliance as described in claim 11 wherein at least one of said first fasteners includes a projection integral with said base portion of said handle and extending through said outer wall of said base, and a locking member mounted to said projection, said locking member adjoining said interior surface of said outer wall of said base.

13. An electric cooking appliance comprising:
a base including a heating element and an outer wall having an exterior surface and an interior surface;
a handle comprised of a thermoplastic material and including a base portion proximal to said exterior surface of said outer wall;
a bracket having substantial rigidity positioned between said base portion of said handle and said exterior surface of said base
means for connecting said handle to said outer wall of said base;
means for connecting said bracket to said outer wall of said base; and
means for connecting said handle to said bracket,
wherein said means for connecting said handle to said outer wall of said base includes a screw extending through said outer wall and said bracket and into said handle.

14. An electric cooking appliance as described in claim 13 wherein said means for connecting said bracket to said outer wall of said base include at least one fastener integral with said bracket and engaging said interior surface of said outer wall.

15. An electric cooking assembly as described in claim 13 including a ceramic cooking vessel positionable within said base.

16. An electric cooking assembly as described in claim 15 wherein said bracket is metal and said means for connecting said bracket to said outer wall includes a tab integral with said bracket.

17. An electric cooking appliance comprising:
a base including a heating element and an outer wall having an exterior surface and an interior surface;
a handle comprised of a thermoplastic material and including a base portion proximal to said exterior surface of said outer wall;
a bracket having substantial rigidity positioned between said base portion of said handle and said exterior surface of said base
means for connecting said handle to said outer wall of said base;
means for connecting said bracket to said outer wall of said base; and
means for connecting said handle to said bracket,
wherein said means for connecting said handle to said outer wall of said base includes a projection integral with said handle that extends through said outer wall and a locking member coupled to said projection and engaging said interior surface of said outer wall.

* * * * *